Feb. 17, 1942.                C. L. RICARDS                2,273,451
                            NEWSPAPER CONVEYER
                            Filed April 5, 1939           2 Sheets-Sheet 1
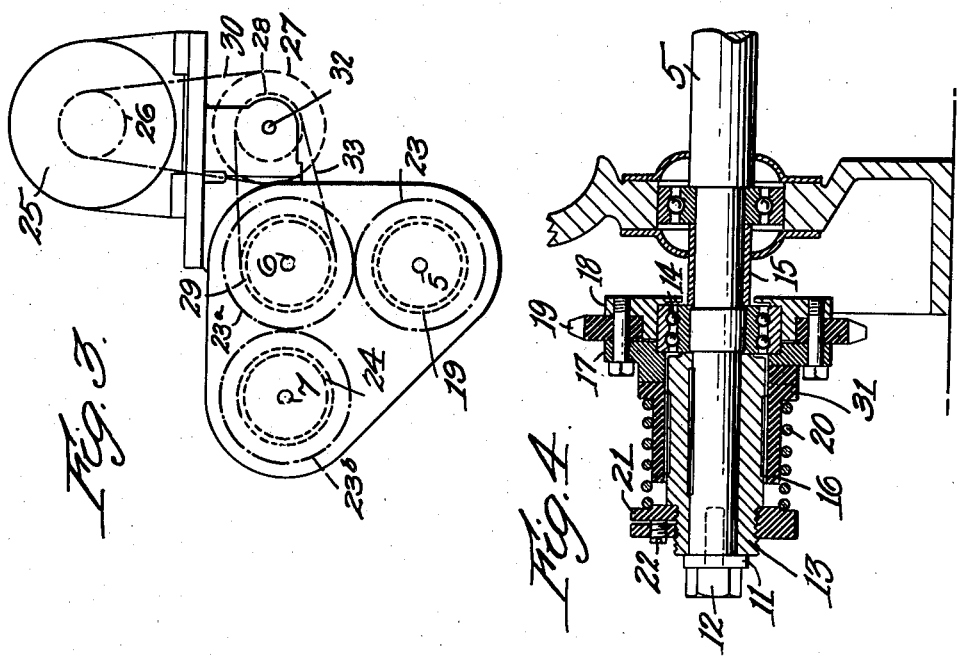
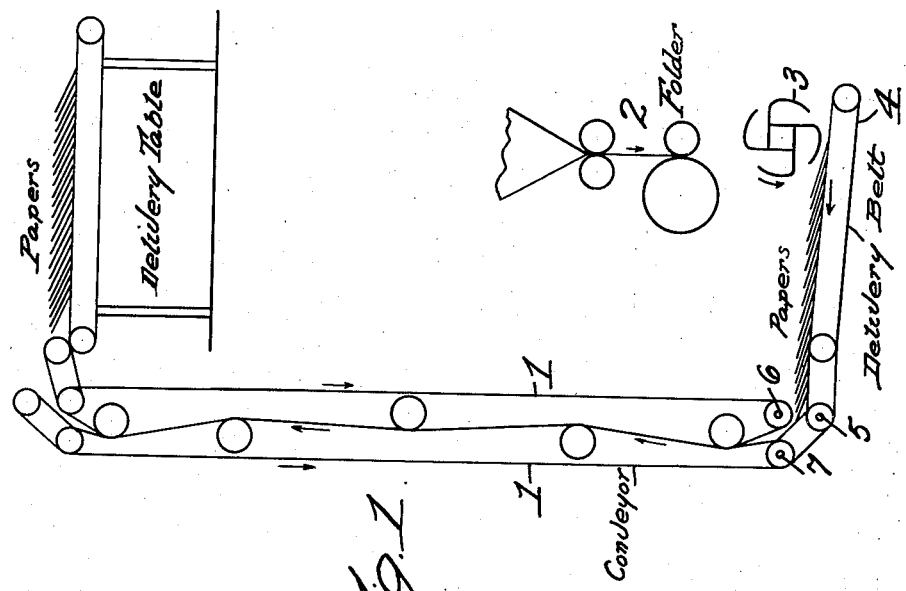

Feb. 17, 1942.   C. L. RICARDS   2,273,451
NEWSPAPER CONVEYER
Filed April 5, 1939   2 Sheets-Sheet 2

Inventor
Charles L. Ricards

Patented Feb. 17, 1942

2,273,451

UNITED STATES PATENT OFFICE 2,273,451

NEWSPAPER CONVEYER

Charles L. Ricards, South Plainfield, N. J., assignor to Wood Newspaper Machinery Corporation, Plainfield, N. J., a corporation of Virginia Application April 5, 1939, Serial No. 266,120

2 Claims. (Cl. 198—203)

The principal objects of this invention are to provide an automatic friction driving mechanism in connection with a newspaper conveyer such that on the application of any undue strain or the occurrence of a breakdown, the driving mechanism transmitting power between the operating chain, or the like, and the conveyer will continue to operate while the driven part remains stationary; thus replacing the usual break or shear pins which are employed for such purpose; to provide a connection between the drive for the conveyer and the driven shaft which can move longitudinally on that shaft so as to provide a yieldable drive; but in case of obstruction, when the jam is removed the drive connection will automatically take up its load again and restore the conveyer to its normal operation.

Other objects and advantages of the invention will appear hereinafter.

Reference is to be had to the accompanying drawings, in which

Fig. 1 is a diagrammatic view showing a typical newspaper conveyer in a newspaper printing and delivery plant and indicating where the features of this invention may be applied;

Fig. 3 is an end view of the conveyer corner in which the power is transmitted to the conveyer and the clutch opened, and Fig. 4 is a sectional view on the line 4—4 of Fig. 2.

Figure 2:
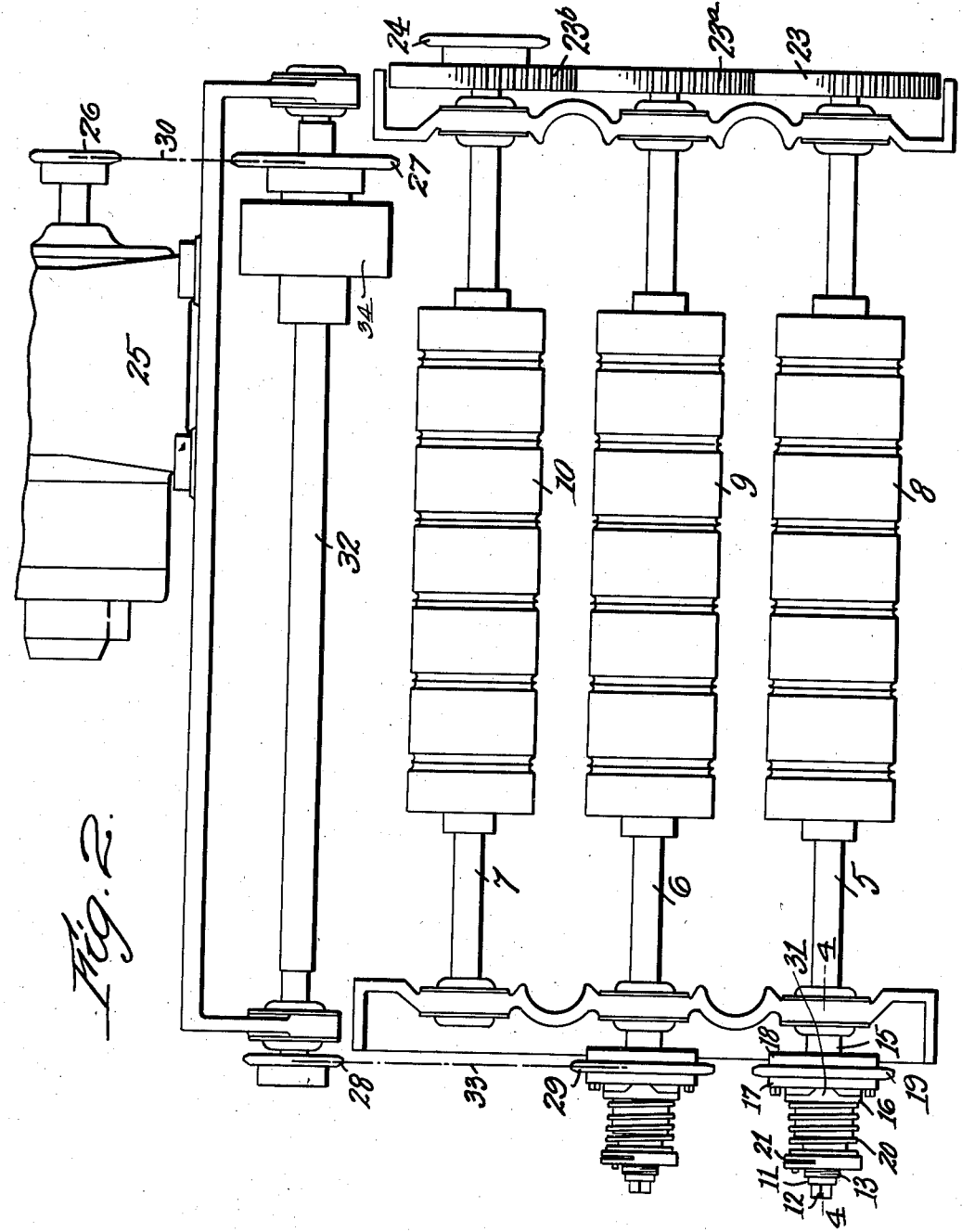
Fig. 2 is a view in side elevation illustrating the application of the spring-seated clutch to the conveyer.

The invention is shown as applied to a conveyer formed of a pair of belts 1 carried over rolls for delivering folded newspapers from the folder 2, delivery fan 3, and a delivery belt 4. Any desired means other than a delivery belt, as 4, may be utilized for delivering the papers to the conveyer belt 1. The folded newspapers on the delivery belt are taken up between two endless belts 1, constituting a newspaper conveyer, to the delivery table, as usual.

It will be seen that at the corner of this conveyer by which the papers are delivered to the conveyer from the delivery belt there are shown three shafts 5, 6 and 7, each one of which has a roll thereon, as for example, 8, 9 and 10. These rolls are secured to the shafts 5, 6 and 7 respectively and said shafts are rotatably mounted in suitable bearings on the side frames of the press. One end of each of the shafts 5 and 6, which are formed identically, is made to carry a slip clutch arrangement by which this invention is made possible.

A washer 11 is held by a screw 12 on the end of the shaft 5. It locks against a clutch sleeve 13. Said sleeve thrusts against the inner race of a bearing 14 carried on the shaft 5, then through a spacer 15 against the inner race of the bearing, forcing it against a shoulder of the shaft 5.

The sleeve 13 is keyed to the shaft 5 and has slidably mounted thereon a clutch jaw 16. Said jaw can move longitudinally, but is held from rotation by splines in the sleeve 13. The jaw 16 engages a clutch plate 17 which cooperates with a hub 18 to carry a main drive sprocket 19. The clutch plate 17 and hub 18 clamp the outer race of the bearing 14.

A spring 20, held by an adjusting nut 21 threadedly mounted on the sleeve 13, causes the clutch jaw 16 to remain engaged with the clutch plate 17 up to a certain working force. This working force is regulated by the nut 21 which is then locked on the thread by a set screw 22. The nut 21 is split throughout part of a circle for this purpose. Clutch teeth 31 are designed with slanting edges to allow the jaws to force themselves apart under extra pressure and to reengage when said pressure is relieved. The degree of this pressure is determined by their angle. It is, therefore, evident that under normal operating conditions any force exerted on the sprocket 19 will be transmitted through the clutch to the shaft 5. The opposite end of the shaft 5 has mounted and fastened thereto a spur gear 23 which, through gears 23a and 23b operate the shafts 6 and 7. Also attached to the shaft 7 is a chain sprocket 24 that continues the drive to the rest of the conveyer.

If an unexpected overload or breakdown occurs in some part of the conveyer, the stopping is transmitted back to the shaft 5 which acts against the clutch jaw action and thereby causes the clutch to disengage, by the separation of the teeth 31. When this occurs, the sprocket 19 will continue to rotate with the jaw 17 and hub 18 on the bearing 14.

A shaft 32 is an intermediate for an auxiliary motor drive. A motor 25 through a chain 30 and sprockets 26 and 27 operates the shaft 32 which in turn, through a sprocket 28 and chain 33 operates a sprocket 29, which is an exact duplicate of the sprocket 19 and is mounted in an identical manner to the shaft 6. When the motor 25 is operated, the clutch arrangement of the shaft 6 will react to overload just as the clutch on the shaft 5.

During the major portion of the operation, the sprocket 19, which by means, not shown, is connected with a drive from the press folder, supplies the drive to the conveyer. During this operation, the motor 25 is held inoperative by having its power turned off. Neither does it rotate since the one-way clutch or drive 34 on shaft 32 will not drive the motor from the conveyer. When the press stops, however, and it is desired to clear the conveyer of papers, the motor 25 is energized and drives the conveyer irrespective of the press. This action is permitted by a similar one-way clutch, not shown, in the connection to the drive from the press folder.

It is now evident that under normal operating conditions the spring seated clutch will operate the conveyer satisfactorily and will disengage when any overload beyond a certain point is obtained. After the overload condition is rectified, the drive will resume its normal position without any mechanical adjustment.

Having thus described my invention and the advantages thereof, I do not wish to be limited to the details herein disclosed, otherwise than as set forth in the claims, but what I claim is:

1. The combination with a newspaper conveyer and means for delivering papers thereto, of means for driving the conveyer, including a shaft and a clutch thereon comprising a sleeve fixed on said shaft, a clutch jaw longitudinally movable with respect to the sleeve but rotatably fixed thereto and having teeth having slanting surfaces, a sprocket rotatably mounted on the shaft for driving the conveyer and having a surface fitting said slanting surface and capable of forcing the jaw longitudinally out of mesh, and a spring for forcing the jaw into mesh whenever the teeth on the sleeve and those on the sprocket come into mesh, a second shaft, an auxiliary motor for operating said second shaft and through it the conveyer, whereby when the motor is energized the conveyer is operated to thereby clear the conveyer of newspapers remaining thereon when the clutch on the first shaft is rendered inoperative.

2. The combination with a newspaper conveyer, of means for driving the conveyer, including a shaft and an overload clutch on said shaft through which the conveyer is driven, a second shaft, including a clutch mounted thereon for driving said conveyer, an auxiliary motor for operating said second shaft and through it the conveyer, whereby the conveyer may be operated when the overload clutch on the first shaft is rendered inoperative to thereby clear the conveyer of newspapers remaining thereon.

CHARLES L. RICARDS